United States Patent
Pascual et al.

(10) Patent No.: US 8,967,976 B2
(45) Date of Patent: Mar. 3, 2015

(54) WIND TURBINE WITH MULTI-PANEL BLADE

(75) Inventors: Eneko Sanz Pascual, Sarriguren (ES);
Ion Arocena De La Rua, Sarriguren (ES); Victor Isla Valles, Imarcoain (ES); Sandra Arroz Collado, Madrid (ES); Luis Alberto Mayor Moreno, Madrid (ES); Iñaki Hermosilla Azanza, Sarriguren (ES); Andoni Rosende Moreno, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 509 days.

(21) Appl. No.: 13/401,046

(22) Filed: Feb. 21, 2012

(65) Prior Publication Data

US 2012/0219425 A1    Aug. 30, 2012

(30) Foreign Application Priority Data

Feb. 24, 2011    (ES) .................... 2011500204

(51) Int. Cl.
*F03D 11/04* (2006.01)
*F03D 1/06* (2006.01)

(52) U.S. Cl.
CPC .......... *F03D 1/0675* (2013.01); *Y02E 10/721* (2013.01)
USPC ........................................................ 416/226

(58) Field of Classification Search
USPC ....... 416/226, 239, 233, 223 R, 224; 415/4.3, 415/4.5
See application file for complete search history.

(56) References Cited

U.S. PATENT DOCUMENTS

| | | | |
|---|---|---|---|
| 4,295,790 A * | 10/1981 | Eggert, Jr. ................ | 416/226 |
| 4,389,182 A | 6/1983 | Gersbeck | |
| 7,517,198 B2 * | 4/2009 | Baker et al. ............. | 416/227 R |
| 2007/0183888 A1 * | 8/2007 | Gunneskov et al. ......... | 415/146 |
| 2007/0253824 A1 * | 11/2007 | Eyb ........................ | 416/223 R |
| 2008/0206062 A1 * | 8/2008 | Sanz Pascual et al. ....... | 416/226 |
| 2009/0155084 A1 * | 6/2009 | Livingston et al. ....... | 416/223 R |

(Continued)

FOREIGN PATENT DOCUMENTS

| DE | 3 109 566 A1 | 10/1982 |
|---|---|---|
| EP | 1 184 566 A1 | 3/2002 |

(Continued)

OTHER PUBLICATIONS espacenet English abstract of DE 3 109 566.

(Continued)

*Primary Examiner* — Edward Look
*Assistant Examiner* — Aaron R Eastman
(74) *Attorney, Agent, or Firm* — Ladas & Parry LLP

(57) ABSTRACT

A wind turbine blade transversely divided in an inboard module (13) and an outboard module (33) provided on their end sections with connecting means, comprising, respectively, an inboard spar (15), an inboard upper shell (17) and an inboard lower shell (19); an outboard spar (35), an outboard upper shell (37) and an outboard lower shell (39); and arranged so that the aerodynamic profile of said inboard and outboard modules (13, 33) is defined by said upper and lower shells (17, 19; 37, 39), in which the inboard spar (15) is composed of two cap prefabricated panels (21, 23) and two web prefabricated panels (25, 27), and the outboard spar (35) is composed of first and second prefabricated panels (41, 43) integrating its caps (45, 47) and webs (49, 51). The invention also refers to a method of fabricating said wind turbine blade.

10 Claims, 3 Drawing Sheets

(56) References Cited

U.S. PATENT DOCUMENTS

| | | | |
|---|---|---|---|
| 2010/0068065 A1* | 3/2010 | Jensen | 416/241 R |
| 2010/0132884 A1* | 6/2010 | Baehmann et al. | 156/293 |
| 2010/0143143 A1* | 6/2010 | Judge | 416/226 |

FOREIGN PATENT DOCUMENTS

| | | |
|---|---|---|
| EP | 1 965 074 A2 | 9/2008 |
| WO | 01/46582 A2 | 6/2001 |
| WO | 01/48378 A1 | 7/2001 |
| WO | 2005/100781 A1 | 10/2005 |
| WO | 2006/103307 A2 | 10/2006 |
| WO | 2007-051879 A1 | 5/2007 |

OTHER PUBLICATIONS espacenet English abstract of WO 2005/100781 A1.
espacenet English abstract of WO 2006/103307 A2.
espacenet English abstract of WO 2007/051879 A1.
espacenet English abstract of WO 01/46582 A2.

* cited by examiner

WIND TURBINE WITH MULTI-PANEL BLADE

CROSS REFERENCE TO THE CORRESPONDING APPLICATION

This application claims the benefit of Spanish Patent Application No. P201100204 filed on Feb. 24, 2011, the contents of which are incorporated herein by reference.

FIELD OF THE INVENTION

The present invention relates generally to wind turbine blades and particularly to multi-panel blades for facilitating its manufacture and transportation.

BACKGROUND

Wind turbines include a rotor that supports a number of blades extending radially therefrom for capturing the kinetic energy of the wind and causing a rotational motion of a driving train coupled to an electric generator for producing electrical power.

The amount of energy produced by wind turbines is dependent on the rotor blade sweeping surface that receives the action from the wind and consequently increasing the length of the blades leads normally to an increase of the power output of the wind turbine.

However, the size of the blades for land-based wind farms is presently limited to some extent by transportation and infrastructure requirements. In particular, the size of bridges and tunnels limit the size of the blade maximum chord.

To solve the transportation problems posed particularly by lengthy blades the prior art teaches the division of the blade in two or more longitudinal sections provided with joining means, so that each section may be manufactured individually and all sections may be assembled at the wind turbine site. Examples of this prior art are the following.

DE 3 109 566 discloses a wind turbine blade subdivided into at least two longitudinal sections which are held together by an expanding bolt.

U.S. Pat. No. 4,389,182 discloses a wind turbine blade subdivided into several longitudinal sections that are interconnected by tensioning members such as steel cables extending through the blade sections.

EP 1 244 873 A1 discloses a wind turbine blade subdivided into longitudinal sections that are joined by means of a butt joint comprising a number of clips arranged along the joint, having the respective ends fixed to the sections to be joined, and bolts for fixing said clips.

WO 2005/100781, WO 2006/103307, WO 2007/051879 in the name of the applicant, disclose wind turbine blades subdivided into longitudinal sections having improved joining means.

There is also prior art teaching the division of the blade in several transversal sections in addition or independently to the division in longitudinal sections. Examples of this prior are the following.

EP 1 184 566 A1 discloses a wind turbine blade which is formed by assembling one, two or more longitudinal sections, each of which comprises a core formed by a longitudinal carbon-fibre tube on which a series of carbon fibre or fiberglass cross ribs are mounted and a cover formed by fiberglass or carbon-fibre joined to said ribs.

WO 01/46582 A2 discloses a wind turbine blade having a plurality of segmented elements attached to a load transmitting box spar and separated by elastic joins which enable the segments to move in relation to one another in order to minimise the tensile stress in the region of the blade in which the segments are located.

EP 1 965 074 in the name of the applicant discloses a wind turbine blade composed of two cap prefabricated panels and two web prefabricated panels placed side by side in a box shape and at least two shell longitudinal sections forming, respectively, the leading edge and the trailing edge of the corresponding blade section that are placed adjacently to a central spar section, the aerodynamic profile of the blade being defined by said cap panels and said shell panels.

The current trend in the wind industry to big rotor blades demands new rotor blades designs suitable for complying with the transportation requirements and with the quality manufacturing requirements involved by blades that can reach lengths of 100 m and maximum chords of 8 m.

The present invention is intended to satisfy said demand.

SUMMARY OF THE INVENTION

An object of the present invention is to provide a wind turbine blade configuration allowing an efficient manufacturing of big wind turbine blades divided in two modules.

Another object of the present invention is to provide a wind turbine blade configuration allowing an optimized design of big wind turbine blades divided in two modules.

In one aspect, these and other objects of the present invention are met by providing a wind turbine blade transversely divided in an inboard module and an outboard module provided on their end sections with connecting means, comprising, respectively, an inboard spar, an inboard upper shell and an inboard lower shell; an outboard spar, an outboard upper shell and an outboard lower shell; and arranged so that the aerodynamic profile of said inboard and outboard modules is defined by said upper and lower shells, in which the inboard spar is composed of two cap prefabricated panels and two web prefabricated panels and the outboard spar is composed of first and second prefabricated panels integrating its caps and webs.

In embodiments of the present invention said two cap prefabricated panels of the inboard spar are composed of main cap parts and root joint parts, the root joint parts being extended until the beginning of the web prefabricated panels and the main cap parts having an initial section coincident with a sector of the root joint parts so that both parts can be joined in said sector. Therefore in the inboard module, where there are significant geometrical and structural differences between the root section and the rest of the spar, the caps are divided in two components in a manner that facilitates its manufacturing without compromising its structural behaviour.

In embodiments of the present invention, the inboard spar is composed of a first prefabricated panel integrating the upper cap and the webs and of the lower cap as the second prefabricated panel. Therefore the spar of the inboard module is assembled with two panels facilitating its manufacturing.

In embodiments of the present invention, the outboard spar is composed of a first prefabricated panel integrating the upper cap and the leading edge web and a second prefabricated panel integrating the lower cap and the trailing edge web. Therefore the spar of the outboard module, that is smaller than the spar of the inboard module, is assembled with two panels of similar shape allowing an optimization of its manufacturing.

In embodiments of the present invention, the prefabricated panels used for assembling the inboard and outboard spars comprise joint flanges that are arranged for conforming joining areas of said prefabricated panels on the outer edges of the inboard and outboard spars. In particular said joint flanges are arranged as parallel flanges by means of, respectively, longitudinal and angular planar extensions of the caps and webs of said prefabricated panels. This joint arrangement facilitates the assembly of the blades.

In embodiments of the present invention the material of said inboard spar main cap parts comprise glass fibre reinforced plastic or carbon fibre reinforced plastic and balsa wood or PVC foam cores. The laminate may be different along the blade such a solid glass fibre reinforced plastic or carbon fibre reinforced plastic laminate at the joining sector with the root joint parts, then a sandwich structure including skins of glass fibre reinforced plastic or carbon fibre reinforced plastic and a balsa wood or a PVC foam core and finally the core is removed and the metallic inserts that are used to assemble both blade modules are integrated in the laminate. Therefore the laminate is adapted to the cap stability needs.

In embodiments of the present invention the material of said two root joint prefabricated parts comprise glass fibre reinforced plastic or carbon fibre reinforced plastic. It is a solid laminate and the metallic inserts that are used to assemble the blade to the hub are integrated in it.

In embodiments of the present invention, the material of said inboard spar web panels comprise glass fibre reinforced plastic and PVC foam cores. The laminate has a sandwich structure including biaxial glass fibre reinforced plastic skins and a PVC foam core that increases the buckling strength.

In embodiments of the present invention, the material of said outboard spar first and second panels comprise glass fibre reinforced plastic or carbon fibre reinforced plastic and balsa wood or PVC foam cores. The laminate may be different along the blade such a solid glass fibre reinforced plastic or carbon fibre reinforced plastic laminate at the intermediate joint in which are integrated the metallic inserts used to assemble both blade modules, then a sandwich structure including skins of glass fibre reinforced plastic or carbon fibre reinforced plastic and a balsa wood or a PVC foam core and finally a solid glass fibre reinforced plastic or a carbon fibre reinforced plastic laminate at the tip of the spar. Therefore the laminate is adapted to the cap stability needs.

In another aspect the above-mentioned objects are met by a method of fabricating a wind turbine blade with the above-mentioned features comprising steps of:
fabricating separately said main cap parts, said root joint parts, said two web prefabricated panels, said first and second prefabricated panels, said inboard upper and lower shells and said outboard upper and lower shells;
assembling said two cap prefabricated panels cocuring said main cap parts and said root joint parts;
assembling said inboard spar bonding the joint flanges of said two cap prefabricated panels and said two web prefabricated panels by means of an adhesive;
assembling said outboard spar bonding the joint flanges of said first and second prefabricated panels by means of an adhesive;
assembling said inboard and outboard modules bonding said shells to said inboard and outboard spars by means of an adhesive;
connecting said inboard and outboard modules.

Other features and advantages of the present invention will be understood from the following detailed description in relation with the enclosed drawings.

DETAILED DESCRIPTION OF PREFERRED EMBODIMENTS

Figure 1A:
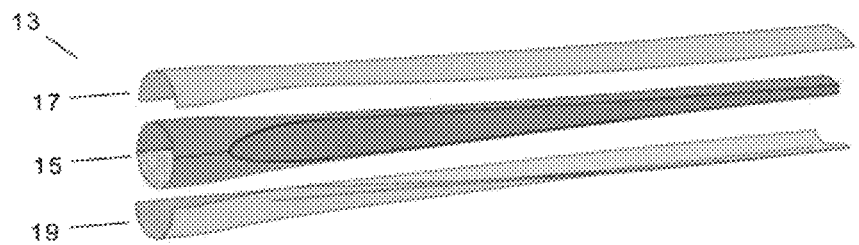
FIG. 1a shows in schematic perspective views the main components of the inboard module of a wind turbine blade according to this invention.
Figure 1B:
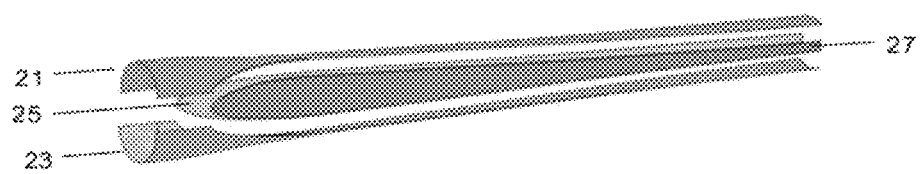
FIG. 1b shows in schematic perspective view the main components of the spar of the inboard module of a wind turbine blade according to this invention.

This invention provides a multi-panel wind turbine blade structure for optimized quality and transportation. The invention involves splitting the whole blade into an outboard and an inboard modules and each of them in several parts for an assembly on site in order to achieve the following objectives.

A first objective is to allow the transport of big blades to the field and the assembly on factory to optimize the manufacturing process.

A second objective is to allow the selection of different materials and/or manufacturing processes and/or structural configurations for the different parts of the blade, particularly for an inboard module and an outboard module. As in any structure, the requirements for the different parts are very different: the inboard module has bigger transversal sections than the outboard module; in both modules the spar is the main load carrying path while the shells are the aerodynamic performance responsible parts but, structurally, less important; within the spars, the caps support higher loads than the webs. A multi-panel blade allows the use of different materials and/or manufacturing processes and/or structural configurations to each part according to its requirements involving an optimization of the blade cost.

A third objective is to improve the manufacturing process of the blades particularly is aspects such the quality control, the productivity, the logistic and the plants size.

In single-part blades the quality assurance is strongly conditioned by its size. In multi-panel blades the quality assurance and potential repairs, if needed, are easier and consequently the non-conformity costs can be reduced. Additionally, the statistic quality control is also improved and a better manufacturing process evolution is possible.

The lead time and tack time of single-part blades manufacturing is high. These times are increasing with the increasing size. Multi-panel blades allow manufacturing the different parts in parallel and the final manufacturing stage of the blade becomes a purely assembly stage.

Multi-panel blades allow the blade manufacturer to organize the lay-outs according to different criteria and subcontracting the manufacturing of some of these parts, if necessary.

As illustrated in FIGS. 1a, 1b, 2 and 5 the inboard module 13 of the blade according to this invention is formed by an spar 15 and upper and lower shells 17, 19.

The spar 15 is formed by an upper cap 21, a lower cap 23, a leading edge web 25 and a trailing edge web 27. The upper and lower caps 21, 23 are formed by main cap parts 21', 23' and root joint parts 21", 23". All those spar single components are prefabricated and then assembled using bonding means such as a polyurethane adhesive in specific bonding areas 65 configured by flanges 61, 63 of said components with the exception of the assembly of the main cap parts 21', 23' and the root joint parts 21", 23" to form the upper and lower caps 21, 23 which is made cocuring said parts for assuring its structural behaviour.

Figure 2:
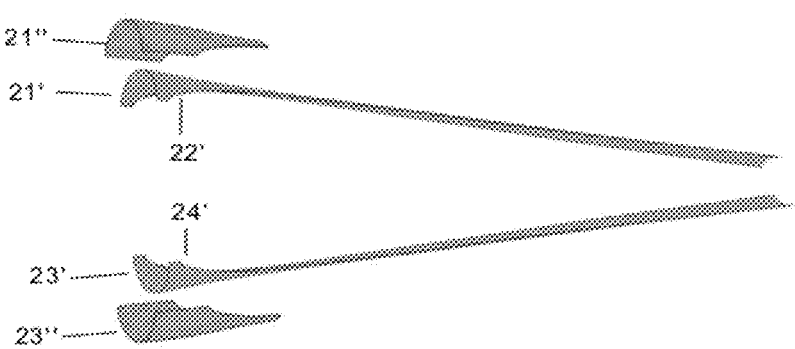
FIG. 2 shows in schematic perspective view the components of the upper and lower caps of the spar of the inboard module of a wind turbine blade according to this invention.

In this case the main reason for the division of the upper and lower caps 21, 23 in said main cap parts 21', 23' and said root joint parts 21", 23" parts is due to, as it can be deduced from FIG. 2, the big dimensional differences existing between the root section and the rest of the spar in the inboard module 13.

The root joint parts 21", 23" extend from the beginning of the blade to the beginning of the web prefabricated panels 25, 27 and the main cap parts 21', 23' are configured with an initial section 22', 24' coincident with a sector of the root joint parts 21", 23" so that both parts 21', 21"; 23', 23" can be joined in said coincident sector. Then, the basic non-coincident area between the root joint parts 21", 23" and the main cap parts 21', 23' is the first section of the root joint parts 21", 23" having a full semicircular shape where the metallic inserts that are used to assemble the blade to the hub shall be integrated.

Figure 8:
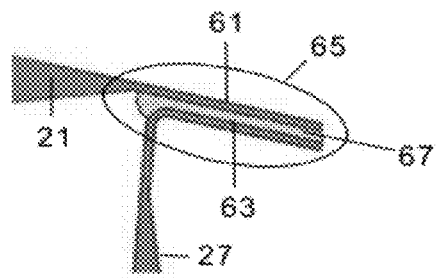
FIG. 8 is an enlarged view of a joining area of two prefabricated panels belonging to a wind turbine blade according to this invention.

FIG. 8 shows an enlarged view of the bonding area 65 between the upper cap 21 and the trailing edge web 27 using an adhesive layer 67. The flange 61 is a longitudinal extension of the upper cap 21 and the flange 63 is an angular extension of the trailing edge web 27 and both flanges 61, 63 are configured as parallel planar segments.

The root joint parts 21", 23" are manufactured in glass fibre reinforced plastic or carbon fibre reinforced plastic over female moulds. The metallic inserts that are used to assemble the blade to the hub are integrated in these parts.

The upper and lower main cap parts 21', 23' are manufactured in glass fibre reinforced plastic or carbon fibre reinforced plastic and balsa wood or PVC foam cores over female moulds. The metallic inserts that are used to assemble both blade modules are integrated in these parts.

The leading edge web 25 and the trailing edge web 27 are manufactured in glass fibre reinforced plastic and PVC foam cores over female moulds.

The shells 17, 19 are manufactured in glass fibre reinforced plastic and PVC foam cores over female moulds.

The shells 17, 19 are bonded together at leading and trailing edge and to the spar caps 21, 23 by means of a polyurethane adhesive.

Figure 3A:
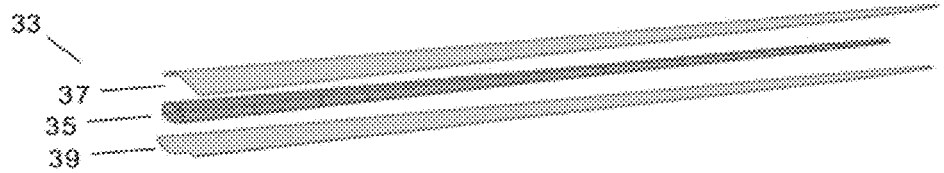
FIG. 3a shows in schematic perspective views the main components of the outboard module of a wind turbine blade according to an embodiment of this invention.
Figure 3B:
FIG. 3b shows in schematic perspective view the main components of the spar of the outboard module of a wind turbine blade according to an embodiment of this invention.
Figure 6:
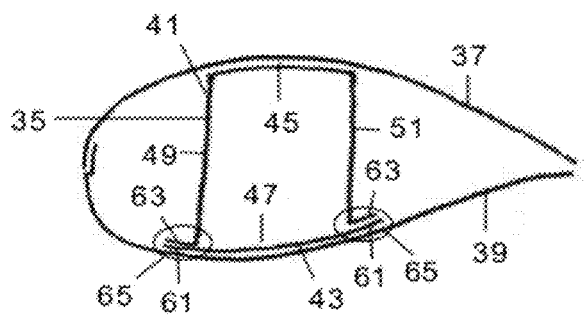
FIG. 6 is a cross-sectional view of an embodiment of the outboard module of a wind turbine blade according to this invention.

As illustrated in FIGS. 3a, 3b and 6 the outboard module 33 of the blade according to an embodiment of this invention is formed by an spar 35 and upper and lower shells 37, 39.

The spar 35 is formed by a first panel 41 integrating the upper cap 45 and the webs 49, 51 and by the lower cap 47 as the second panel 43. These panels are prefabricated and then assembled using bonding means such as a polyurethane adhesive in the specific bonding areas 65 configured by flanges 61, 63 of said panels in a similar manner to that described above in reference to FIG. 8.

The first panel 41 is manufactured in carbon fibre reinforced plastic or glass fibre reinforced plastic and balsa wood or foam cores over female moulds. The metallic inserts that are used to assemble both blade modules are integrated in this part.

The second panel 43 is manufactured in carbon fibre reinforced plastic or glass fibre reinforced plastic and balsa wood or PVC foam cores over female moulds. The metallic inserts that are used to assemble both blade modules are integrated in this part.

The shells 37, 39 are manufactured in glass fibre reinforced plastic and PVC foam cores over female moulds.

The shells 37, 39 are bonded together at leading and trailing edge and to the spar caps 45, 47 by means of a polyurethane adhesive.

Figure 4A:
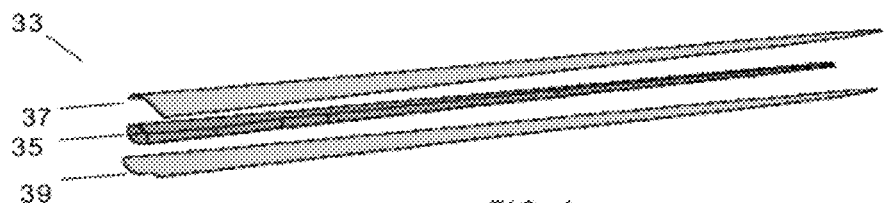
FIG. 4a shows in schematic perspective views the main components of the outboard module of a wind turbine blade according to another embodiment of this invention.
Figure 4B:
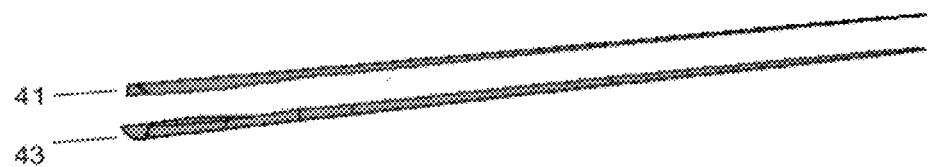
FIG. 4b shows in schematic perspective view the main components of the spar of the outboard module of a wind turbine blade according to another embodiment of this invention.
Figure 5:
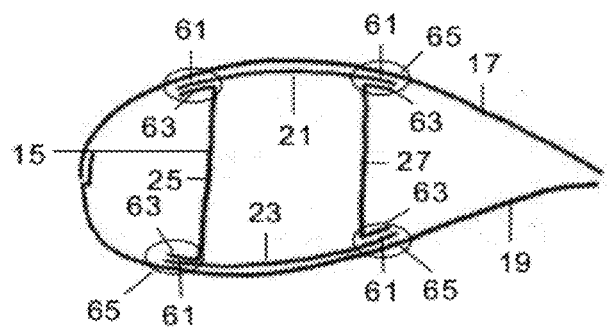
FIG. 5 is a cross-sectional view of the inboard module of a wind turbine blade according to this invention.
Figure 7:
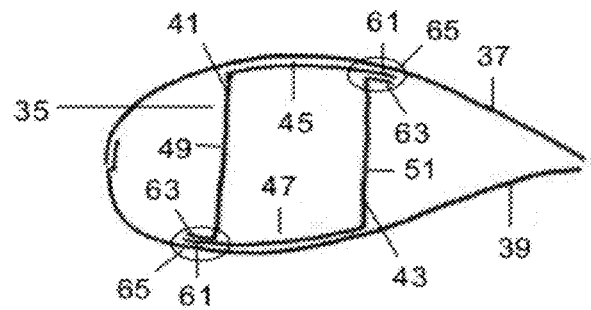
FIG. 7 is a cross-sectional view of another embodiment of the outboard module of a wind turbine blade according to this invention.

In another embodiment of the outboard module 33 shown in FIGS. 4a, 4b and 7, the spar 35 is formed by a first panel 41 integrating the upper cap 45 and the leading edge web 49 and by a second panel 43 integrating the lower cap 47 and the trailing edge web 51. These panels are prefabricated and then assembled using bonding means such as a polyurethane adhesive in specific bonding areas 65 configured by flanges 61, 63 of said panels in a similar manner to that described above in reference to FIG. 8.

The first panel 41 is manufactured in carbon fibre reinforced plastic or glass fibre reinforced plastic and balsa wood or PVC foam cores over female moulds. The metallic inserts that are used to assemble both blade modules are integrated in this part.

The second panel 43 is manufactured in carbon fibre reinforced plastic or glass fibre reinforced plastic and balsa wood or PVC foam cores over female moulds. The metallic inserts that are used to assemble both blade modules are integrated in this part.

The shells 37, 39 are manufactured in glass fibre reinforced plastic and PVC foam cores over female moulds.

The shells 37, 39 are bonded together at leading and trailing edge and to the spar caps 45, 47 by means of a polyurethane adhesive.

An important feature of the present invention is that the materials, structural configuration and manufacturing process of each panel in the inboard and outboard modules of the blade are different, allowing an optimization of the blade design and/or manufacturing.

Although the present invention has been fully described in connection with preferred embodiments, it is evident that modifications may be introduced within the scope thereof, not considering this as limited by these embodiments, but by the contents of the following claims.

The invention claimed is:

1. A wind turbine blade transversely divided in an inboard module (13) and an outboard module (33) provided on their end sections with connecting means, comprising, respectively, an inboard spar (15), an inboard upper shell (17), and an inboard lower shell (19);

an outboard spar (35), an outboard upper shell (37), and an outboard lower shell (39);

and arranged so that the aerodynamic profile of said inboard and outboard modules (13, 33) is defined by said inboard and outboard upper and lower shells (17, 19; 37, 39); wherein:

the inboard spar (15) is composed of two cap prefabricated panels (21, 23) and two web prefabricated panels (25, 27); and the outboard spar (35) is composed of first and second prefabricated panels (41, 43) which integrate upper and lower caps (45, 47) and two webs (49, 51);

wherein said two cap prefabricated panels (21, 23) are composed of main cap parts (21', 23') and root joint parts (21", 23"), the root joint parts (21", 23") extending longitudinally from a root to the beginning of the web prefabricated panels (25, 27), the main cap parts (21', 23') having an initial section (22', 24') coincident with a sector of the root joint parts (21", 23") so that both the main cap parts and the root joint parts (21', 21"; 23', 23") can be joined in said sector; and wherein the material of said main cap parts (21', 23') of said inboard spar (15) comprise one of carbon fiber reinforced plastic and glass fiber reinforced plastic and further comprise one of balsa wood and PVC foam cores.

2. A wind turbine blade according to claim 1, wherein the outboard spar (35) is composed of the first prefabricated panel (41) which integrates the upper cap (45) and the two webs (49, 51) and is also composed of the lower cap (47) as the second prefabricated panel (43).

3. A wind turbine blade according to claim 1, wherein the outboard spar (35) is composed of the first prefabricated panel (41) integrating the upper cap (45) and one of the two webs (49) which is a leading edge web (49) and the second prefabricated panel (43) integrating the lower cap (47) and the other of the two webs (51) which is a trailing edge web (51).

4. A wind turbine blade according to claim 1, wherein said two cap prefabricated panels and said first and second prefabricated panels (21, 23, 25, 27, 41, 43) each comprise joint flanges (61, 63) for assembling the inboard and outboard spars (15, 35) that are arranged for conforming joining areas (65) of said two cap prefabricated panels and said first and second prefabricated panels (21, 23, 25, 27, 41, 43) on outer edges of the inboard and outboard spars (15, 35).

5. A wind turbine blade according to claim 4, wherein said joint flanges (61, 63) are arranged as parallel flanges by means of, respectively, longitudinal and angular planar extensions of the caps (21, 23, 45, 47) and webs (25, 27, 49, 51) of said prefabricated panels.

6. A wind turbine blade according to claim 1, wherein the root joint parts (21", 23") of the two cap prefabricated panels (21, 23) comprise carbon fiber reinforced plastic material or glass fiber reinforced plastic material.

7. A wind turbine blade according to claim 1, wherein the two web prefabricated panels (25, 27) of the inboard spar (15) comprise glass fiber reinforced plastic material and PVC foam cores material.

8. A wind turbine blade according to claim 1, wherein the outboard spar first prefabricated panel (41) comprises one of carbon fiber reinforced plastic material and glass fiber reinforced plastic material and further comprise one of balsa wood material and PVC foam cores material.

9. A wind turbine blade according to claim 1, wherein the outboard spar second prefabricated panel (43) comprises one of carbon fiber reinforced plastic material and glass fiber reinforced plastic material and further comprises one of balsa wood material and PVC foam cores material.

10. A method of fabricating a wind turbine blade according to claim 1, comprising the steps of:

fabricating separately main cap parts (21', 23'), root joint parts (21", 23"), said two web prefabricated panels (25, 27), said first and second prefabricated panels (41, 43), said inboard upper and lower shells (17, 19), and said outboard upper and lower shells (37, 39);

assembling said two cap prefabricated panels (21, 23), co-curing said main cap parts (21', 23') and said root joint parts (21", 23");

assembling said inboard spar (15), bonding joint flanges (61, 63) of said two cap prefabricated panels (21, 23) and said two web prefabricated panels (25, 27) by means of an adhesive;

assembling said outboard spar (35), bonding the joint flanges (61, 63) of said first and second prefabricated panels (41, 43) by means of an adhesive;

assembling said inboard and outboard modules (13, 33), bonding said shells (17, 19; 37, 39) to said inboard and outboard spars (15, 35) by means of an adhesive; and connecting said inboard and outboard modules (13, 33).

* * * * *